United States Patent [19]

Spiecker

[11] Patent Number: 5,142,545
[45] Date of Patent: Aug. 25, 1992

[54] LASER DYE

[75] Inventor: Gerd Spiecker, Göttingen, Fed. Rep. of Germany

[73] Assignee: Lambda Physik Gesellschaft Zur Herstellung Von Lasern mbH, Gottingen, Fed. Rep. of Germany

[21] Appl. No.: 717,339

[22] Filed: Jun. 18, 1991

[30] Foreign Application Priority Data

Jul. 27, 1990 [DE] Fed. Rep. of Germany ....... 4023966

[51] Int. Cl.⁵ .............................................. H01S 3/20
[52] U.S. Cl. .................................. 372/53; 252/301.17
[58] Field of Search ................ 372/53, 39; 252/301.17

Primary Examiner—Léon Scott, Jr.
Attorney, Agent, or Firm—Brumbaugh, Graves, Donohue & Raymond

[57] ABSTRACT

Dye for a dye laser according to the general formula:

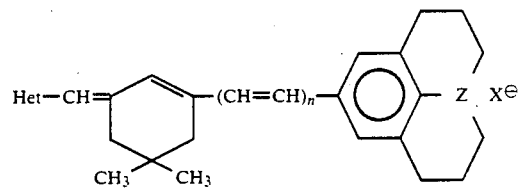

wherein:
$X^-$ is an acid anion and
Het is the non-metal atoms necessary to complete a heterocyclic ring,
$n = 1 - 3$.

41 Claims, 1 Drawing Sheet

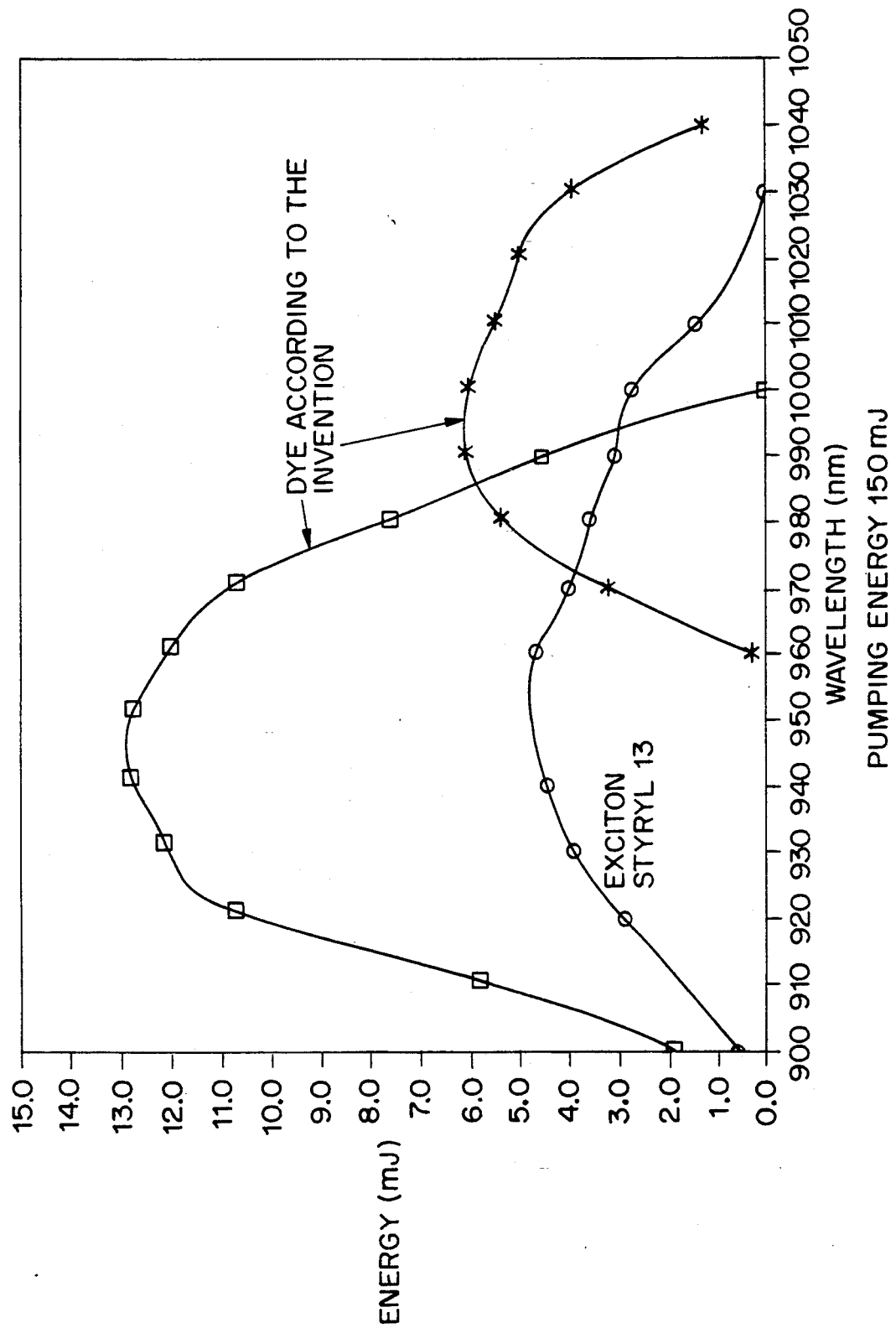

LASER DYE

The invention relates to a laser dye, that is a dye for dye lasers which are known to the person skilled in the art in construction and mode of operation.

In a dye laser a dye is dissolved in a solvent and the solvent serves as active medium of a laser resonator in which a population inversion is carried out in order to generate coherent radiation by stimulated emission (or also the phenomenon of super radiance). The stimulation of the dye solution in which said population inversion of the electron states of the dye is achieved is carried out by means of a separate energy source, for example a flashlamp or also by means of another laser, for example a gas laser, e.g. $N_2$ or Ar). Electron beams are also known for stimulating the laser dye.

The great advantage of dye lasers resides in their tunability, i.e. relatively wide wavelength ranges can be tuned depending upon the dye used. A wavelength-selective element arranged in the resonator is employed for the tuning.

The stimulation of the dye solution, which is also referred to as "optical pumping", causes electrons of the molecules of the laser dye to be raised from the energetic base state to a higher energy state from which the transition of the electrons to a lower energetic state generating the laser radiation takes place.

Due to the relatively wide fluorescence bandwidth of the known dyes, dye lasers can be operated practically over the entire visible range of the electromagnetic spectrum, separate dyes being available for the individual wavelength ranges.

A great number of laser dyes are known but in the wavelength range around 1000 nanometres there is a shortage of laser dyes of good efficiency, i.e. dyes with which a high intensity of the laser beam can be achieved and which have a long life.

The invention is based on the problem of providing a laser dye which has a high effectiveness and long life, in particular in the infrared range of the electromagnetic spectrum.

The solution of this problem according to the invention is set forth in various embodiments in the claims.

DE 22 60 210.4 A1 discloses a laser dye likewise effective in the infrared range. The laser dye according to the invention however differs therefrom in that it is effective at a longer wavelength range and has a higher stability. The laser dye is active in the range of 1000 nanometers, in particular in the range from 650 to 1050 nanometers.

The laser dye is preferably used in a dye solution containing the dye in a concentration of $10^{-2}$ to $10^{-4}$ mol/l.

The invention thus relates also to a dye laser using the dye according to the invention.

FIG. 1 represents an energy v.s. wavelength plott of the dye laser.

Hereinafter the invention will be explained with the aid of an example.

EXAMPLE

In a dye laser arrangement of a type known per se a compound of the formula

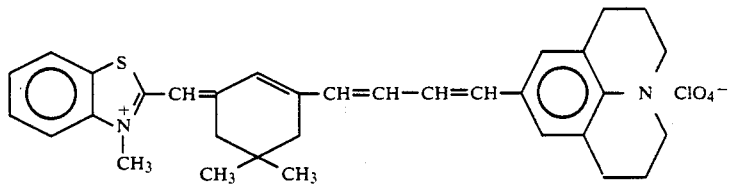

was investigated for its laser activity. For pumping the dye solution an XeCl excimer laser was used having a wavelength of 308 nanometers and a pump energy of 150 mJ. The aforementioned compound was dissolved in dimethyl sulfoxide having a concentration of 1 gram per liter. The solution thus formed was pumped from a reservoir in a manner known per se through the dye cell of the laser resonator.

The tuning of the wavelength is also carried out in known manner by means of a reflection grating with stepping motor drive. A laser spectrum was recorded by means of a photomultiplier and a recorder. In FIG. 1 the exit energy of the dye laser thus formed is plotted in percent of the pumping power as a function of the wavelength. The results achieved with a dye according to the invention can be seen from the curves formed by boxes and stars whilst the other curve marked by circles corresponds to laser dyes according to the prior art.

The laser dye according to the invention has a higher output energy over a substantially wider wavelength range.

I claim:

1. A dye for a dye-laser having the formula

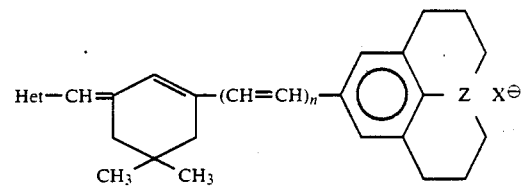

wherein
$x^-$ is an acid anion
Het is a heterocyclic ring of non-metal
$n=1$ to 3.

2. A dye according to claim 1 wherein the acid anion is selected from the group consisting of chloride, bromide, iodide, thiocyanate, perchlorate, p-toluene sulfate and tetrafluroborate anion.

3. A dye according to claim 1 wherein Het is a substituted heterocyclic ring of non-metal atoms.

4. A dye according to claim 1 wherein said heterocyclic ring is a five membered ring.

5. A dye according to claim 1 wherein said heterocyclic ring is a six membered ring.

6. A dye according to claim 1 wherein said heterocyclic ring is a thiazole ring.

7. A dye according to claim 6 wherein said heterocyclic ring is selected from the group consisting of 4-methylthiazole, 4-phenylthiazole, 5-methylthiazole, 5- phenylthiazole, 4, 5-dimethylthiazole, 4, 5-diphenylthiazole and 4-(2-thienyl)-thiazole.

8. A dye according to claim 1 wherein said heterocyclic ring is a naphthothiazole ring.

9. A dye according to claim 8 wherein said heterocyclic ring is selected from the group consisting of naptho-[1,2]-thiazole, naphtho-[2,1]-thiazole, napto-[2,3]-thiazole, 5-methoxynaphto-[2,1]-thiazole, 5-ethoxynaphtho-[2,1]-thiazole, 8-methoxynapto-[1,2]-thiazole, and 7-methoxynaphtho-[1,2]-thiazole.

10. A dye according to claim 1 wherein said heterocyclic ring is a thianaphtheno -7', 6', 4, 5 thiazole ring.

11. A dye according to claim 10 wherein said heterocyclic ring is selected from the group consisting of 4'-methoxythia 2, 3, 6, 7-tetrahydro -1H, 5H-benzo-[ij]-quinolizine-9-yl radical, and naptheno -7', 6', 4, 5-thiazole.

12. A dye according to claim 1 wherein said ring is an oxazole ring.

13. A dye according to claim 1 wherein said heterocyclic ring is selected from the group consisting of 4-methyloxazole, 5-methyloxazole, 4-phenyloxazole, 4, 5-diphenyloxazole, 4-ethyloxazole, 4, 5-dimethyloxazole, and 5-phenyloxazole.

14. A dye according to claim 1 wherein said heterocyclic ring is a benzoxazole ring.

15. A dye according to claim 14 wherein said heterocyclic ring is selected from the group consisting of 5-chlorobenzoxazole, 5-methylbenzoxazole, 5-phenylbenzoxazole, 6-methylbenzoxazole, 5-6-dimethylbenzoxazole, 4,6-dimethylbenzoxazole, 5-methoxybenzoxazole, 5-ethoxybenzoxazole, 6-methoxybenzoxazole, 5-hydroxybenzoxazole, and 6-hydroxybenzoxazole.

16. A dye according to claim 1 wherein said heterocyclic ring is a naphthoxazole ring.

17. A dye according to claim 1 wherein said heterocyclic ring is selected from the group consisting of naphtho [1,2] oxazole, naththo-[2,1]-oxazole, and naphtho-[2,3] oxazole.

18. A dye according to claim 1 wherein said heterocyclic ring is a thiazoline ring.

19. A dye according to claim 18 wherein said heterocyclic ring is a 4-methylthiazoline ring.

20. A dye according to claim 1 wherein said heterocyclic ring is an imidazoquinoline ring.

21. A dye according to claim 20 wherein said heterocyclic ring is an 1N-imidazo-[4,5-b]-quinoline ring.

22. A dye according to claim 1 wherein said heterocyclic ring is a benzo [c]-indole ring.

23. A dye according to claim 22 wherein said heterocyclic ring is a 1,1'-dimethylbenzo-[e]-indole ring.

24. A dye according to claim 1 wherein said heterocyclic ring is a benzimidazole ring.

25. A dye according to claim 24 wherein said heterocyclic ring is selected from the group consisting of 1,3-diethylbenzimidazole and 1-ethyl-3-phenylbenzimidazole.

26. A dye according to claim 1 wherein said heterocyclic ring is a napthimidazole ring.

27. A dye according to claim 26 wherein said heterocyclic ring is 1H-naptho-[2,3]-imidazaole.

28. A dye according to claim 1 wherein said heterocyclic ring is a 3,3-dialkylindolenine ring.

29. A dye according to claim 28 wherein said heterocyclic ring is selected from the group consisting of 3,3-dimethylindolenine, 3,3,5-trimethylindolenine and 3,3,7-trimethylindolenine.

30. A dye according to claim 1 wherein said heterocyclic ring is a 2-pyridine ring.

31. A dye according to claim 30 wherein said heterocyclic ring is a 5-methylpyridine ring.

32. A dye according to claim 1 wherein said heterocyclic ring is a 4-pyridine ring.

33. A dye according to claim 1 wherein said heterocyclic ring is an imidazo-[4,5-b]-quinoxaline ring.

34. A dye according to claim 33 wherein said heterocyclic ring is selected from the group consisting of 1,3-dialkylimidazo-[4,5-b]-quinoxaline, 1,3-diethylimidazo [4,5-b]-quinoxaline, and 6-chloro-1,3-diethylimidazo-[4,5-b] quinoxaline.

35. A dye according to claim 34 wherein said 1,3-dialkylimidazo-[4,5-b]-quinoxaline is 1,3 diethylimidazo-[4,5-b]-quinoxaline.

36. A dye according to claim 1 wherein said heterocyclic ring is a 1,3-dialkenylimidazo-[4,5-b]-quinoxaline ring.

37. A dye according to claim 36 wherein said heterocyclic ring is selected from the group consisting of 1,3-diallylimidazo-[4,5-b]-quinoxaline and 6-chloro-1,3-diallylimidazo [4,5-b] quinoxaline.

38. A dye according to claim 1 wherein said heterocyclic ring is a 1,3 diarylimidazo-[4,5-b]-quinoxaline ring.

39. A dye according to claim 38 wherein said heterocyclic ring is selected from the group consisting of 6,7-dichloro-1,3-diphenylimidazo-[4,5-b]-quinoxaline, 1,3-diphenylimidazo-[4,5-b]-quinoxaline, 6-chloro-1,3-diphenylimidazo-[4,5-b]-quinoxaline, and 1,3-bis-(p-chlorophenyl)imidazo-[4,5-b]quinoxaline.

40. A dye laser comprising a laser dye as in claim 1.

41. A laser dye solution comprising

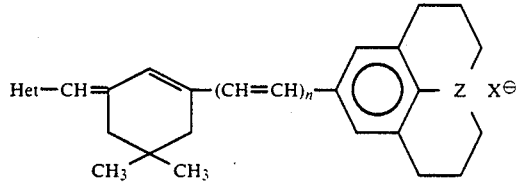

wherein
x⁻ is an acid anion
Het is a heterocyclic ring of non-metal atoms
n=1 to 3
and a solvent selected from the group consisting of water, methanol, ethanol, isopropanol, butanol, ethylene glycol, glycol monoethyl ether, tetrahydrofuran, dioxane, benzene, toluene, phenol, resorcin, cresols, cyclohexane, decalin, chloroform, dimethylsulfoxide, acetone, 2-butanone, cyclohexanone, acetic acid ethyl ester, malonic acid diethyl ester, glycol diacetate, diethyl carbonate, and flurorinated alcohol.

* * * * *